United States Patent
Ozawa et al.

(10) Patent No.: US 6,525,437 B1
(45) Date of Patent: Feb. 25, 2003

(54) ROTATING ELECTRICAL MACHINE STATOR

(75) Inventors: Masaru Ozawa, Wako (JP); Takeo Fukuda, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 39 days.

(21) Appl. No.: 09/645,413

(22) Filed: Aug. 24, 2000

(30) Foreign Application Priority Data

Aug. 26, 1999 (JP) .......................... 11-240590

(51) Int. Cl.⁷ .................. H02K 5/18; H02K 15/12; H02K 1/12
(52) U.S. Cl. .................. 310/65; 310/45; 310/254
(58) Field of Search .................. 310/254, 42, 43, 310/44, 45, 65, 64, 58, 52, 85, 179, 214, 258, 194, 195

(56) References Cited

U.S. PATENT DOCUMENTS

| | | | |
|---|---|---|---|
| 3,963,950 A | * 6/1976 | Watanabe et al. | 310/64 |
| 4,137,471 A | 1/1979 | Sato et al. | 310/51 |
| 4,247,978 A | 2/1981 | Smith | 29/596 |
| 4,454,439 A | * 6/1984 | Okamoto et al. | 29/596 |
| 4,933,581 A | * 6/1990 | Shramo | 310/86 |
| 5,313,131 A | 5/1994 | Hibino et al. | 310/254 |

FOREIGN PATENT DOCUMENTS

| | | |
|---|---|---|
| CA | 932013 | 8/1973 |
| JP | 52057906 | 5/1977 |
| JP | 56-145605 | 11/1981 |
| JP | 56160012 A | * 12/1981 |
| JP | 08140294 | 5/1996 |

OTHER PUBLICATIONS

Epoxies, Etc..., Thermally Conductive Resins, Jan. 20, 1997, Webmaster@epoxies.com*

* cited by examiner

*Primary Examiner*—Nestor Ramirez
*Assistant Examiner*—Guillermo Perez
(74) *Attorney, Agent, or Firm*—Carrier, Blackman & Associates, P.C.; Joseph P. Carrier; William D. Blackman (57) ABSTRACT

A stator of a rotating electrical machine has improved heat dissipation of a stator and end portions of a stator winding thereof which are protected from damage due to stress concentration, by inserting a silicone rubber sheet between a stator core having no slots and the stator winding which is accommodated thereinside. The silicone rubber sheet comprises a rubber type material having flexibility so as to be deformable under pressure, which is reinforced by a glass cloth or a polyester mesh cloth. Moreover, this is preferably an insulating and heat dissipating sheet which contains a filler having good thermal conductivity. More preferably, a silicone rubber sheet which contains boron nitride is used. Furthermore, a protective sheet of a resin material is further inserted between the stator core and end portions of the stator winding over the silicone rubber sheet.

22 Claims, 8 Drawing Sheets

ROTATING ELECTRICAL MACHINE STATOR

BACKGROUND OF THE INVENTION

1. Field of the Invention

The present invention relates to a stator of a rotating electrical machine where a cylindrical shape stator winding is enclosed inside a cylindrical shape stator core having no slots, and in particular to effective technology for improving heat dissipation of the stator, and effective technology for protecting an end portion of the stator winding from damage due to stress concentration.

2. Description of the Related Art

Heretofore, as effective technology for improving heat dissipation of a stator, there is known a stator of an electrical rotating machine as disclosed in Japanese Patent Application, First Publication No. Sho 53-54705.

This stator has a construction in which a heat conducting member is inserted between a casing (yolk) and a stator winding (coil). By closely contacting not only between the stator core and the stator winding, but also over the whole region between the casing and the stator winding, the heat dissipation is significantly improved.

This stator however is one having so called slots, and while the heat conducting material is inserted between the casing and the stator winding, the heat conducting material is not inserted between the stator winding and the stator core. Hence this gives a construction where the temperature distribution varies along the circumferential direction of the stator.

Consequently if at the time of operation, distortion due to heating occurs, there is the likelihood of the casing and the stator winding which are closely contacted via the heat conducting member separating, resulting in a drop in heat dissipation.

On the other hand, with a conventional slotless stator, in the case where a cylindrical stator winding is accommodated inside a cylindrical stator core having no slots, in order to secure the insulation between the stator core and the stator winding, an insulation paper (for example a Nomex sheet made by Dupont) is inserted between the stator core and the stator winding.

However, while this insulation sheet has sufficient insulation, thermal conductivity and flexibility are lacking so that it is not possible to maintain a close contact between the stator core and the stator winding. Therefore an air space occurs at the interface, which obstructs heat dissipation.

Moreover, the slotless stator is generally formed by inserting the stator winding into the stator core having no slots, and then inserting a mandrel into the stator winding. Then with these in a held together condition, impregnating and hardening a resin.

However, when the mandrel thermally expands at the time of heat hardening, the end portion of the stator winding is pressed against the stator core edge portion (the intersection ridge line portion between the inner peripheral face and the end face), so that stress is concentrated at the portion pressing against the edge portion. Therefore, there is the case where the stator winding is damaged and the insulation layer lost, resulting in shorting.

SUMMARY OF THE INVENTION

The present invention takes into consideration the above situation, with the object of improving heat dissipation of the stator, and protecting the end portion of the stator winding from damage due to stress concentration.

In order to achieve the above objects, the present invention adopts the following means.

That is, according to the present invention, a stator of a rotating electrical machine is provided which comprises a cylindrical stator core having no slots, a cylindrical stator winding accommodated inside the cylindrical stator core, and a heat dissipating sheet inserted between the stator core and the stator winding.

With this construction, since the heat dissipating sheet is inserted between the stator core having no slots and the stator winding, variations in temperature distribution along the circumferential direction of the stator at the time of operation can be suppressed. Hence the close contact condition between the stator core and the stator winding can be more reliably maintained, and the heat generated in the stator winding can be effectively transmitted via the heat dissipating sheet, thus improving heat dissipation.

With this construction, in the case where the heat dissipating sheet contains a filler having good thermal conductivity, heat dissipation can be improved without causing a drop in strength or insulation properties. Moreover, with the above construction, in the case where the heat dissipating sheet is made from a rubber type material having flexible properties, being deformable by pressing, one surface thereof can be closely contacted with the stator winding so as to replicate the irregularities thereof, while the other surface can be closely contacted with the stator core. Therefore the heat dissipation can be further improved while maintaining insulation properties.

The heat dissipating sheet having the above properties is one which can be obtained by mixing a matrix resin with a heat conducting filler. More specifically, for the matrix resin a natural rubber or a synthetic rubber such as butadiene rubber, nitrol rubber, butyl rubber, silicone rubber, fluororubber, or acrylic rubber may be used.

Moreover, for the heat conducting filler, boron nitride, aluminum nitride, or alumina may be used.

In particular, in the case where silicone rubber sheet is used for the heat dissipating sheet, due to the elastic deformation thereof, one surface is closely contacted with the stator winding so as to replicate the irregularities thereof, and the other surface is closely contacted with the stator core. Therefore, the heat dissipation is even more improved. Furthermore, a silicone rubber sheet is also suitable from the point of having excellent thermal tolerance even if this becomes exposed to a high temperature with the stator winding generating heat, and from the point of not generating noxious gasses due to not containing halogens or the like.

Moreover, for the heat conducting filler, boron nitride having high thermal conductivity, and excellent electrical insulation properties, chemical stability, and filler properties, which is widely used for electrical insulation purposes, and as a heat dissipating filler, is ideal.

A silicone heat dissipating sheet having such a construction is marketed for use in transistor heat dissipation and the like. For example, it is possible to use a heat dissipation silicone rubber sheet made by the Shin-Etsu Chemical Co. Ltd. (TC-BG type) or a heat dissipating sheet made by Denka (BFG type).

Furthermore, with any of the above constructions, in the case where a protective sheet is further inserted between the end portion of the stator core and the end portion of the stator winding, the end portion of the stator winding is reinforced by the protective sheet. Therefore, even if a stress concentration occurs in part of the stator, the stator winding can be effectively prevented from being damaged.

DESCRIPTION OF THE PREFERRED EMBODIMENTS

Hereunder is a description of embodiments of the present invention with reference to the drawings.

Figure 1:
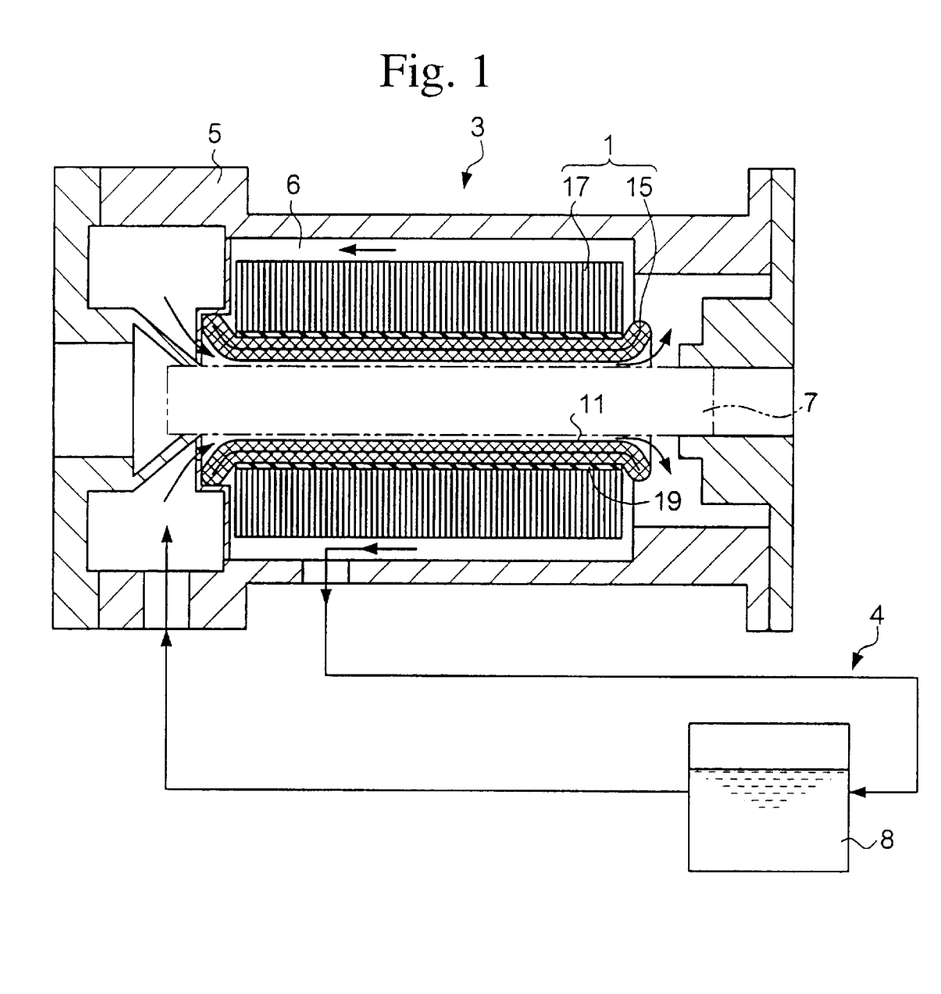
FIG. 1 is a longitudinal cross-section view of a rotating electrical machine having an embodiment of a stator according to the present invention.

FIG. 1 shows a rotating electrical machine 3 incorporating a slotless stator 1. This rotating electrical machine 3 is suitable to use as a high speed rotating electric machine which is used for example at several kW to several tens of kW, and at rotational speeds above several ten thousand rpm.

With the rotating electrical machine 3, the outer shape is formed from a casing 5, and a rotor 7 is rotatably arranged via bearings (not shown) along a central axis of the casing 5.

An oil passage 6 constituting one part of an oil pressure circuit 4 is formed in the casing 5.

Lubricating oil is supplied to the oil passage 6 from a supply source 8, and by means of this lubricating oil, lubrication of the bearings and cooling of the slotless stator 1 is simultaneously performed.

At this time, the cooling of the slotless stator 1 is performed in sequence from the inner periphery to the outer periphery, as shown by the arrow in FIG. 1.

A permanent magnet serving as a magnetic field generating device is incorporated into the rotor 7.

The permanent magnet is constructed so that p (where p is an even number of two or more) magnetic poles for generating a magnetic flux in the radial direction, are formed on the outer surface of the rotor 7.

For the permanent magnet, a rare earth magnet such as Sm—Co, Nd—Fe—B sintered magnet is suitable.

The slotless stator 1 is arranged around the rotor 7, forming a small gap 11 via an inner tube (omitted from the figure).

This inner tube is for containing the lubricating oil which flows on the inner peripheral side of the slotless stator 1 (shown by the arrow in FIG. 1), and is made for example from a zirconia ceramic.

The slotless stator 1 is one which is not formed with slots for securing a stator winding 15.

Moreover, the slotless stator 1 is constructed with the stator winding 15 located on the rotor 7 side and a stator core 17 located on the casing 5 side. The stator winding 15 having an outer diameter larger than the inner diameter of the stator core 17 in the natural condition is arranged inside the stator core 17 with a resiliently contracted diameter.

The stator core 17 is in the form of a hollow cylindrical body with a cylindrical surface which is not formed with slots on the inner peripheral surface, and is secured to the casing 5 at opposite end portions so that the oil passage 6 for passing lubricating oil (shown by the arrow in FIG. 1) is formed between the outer periphery thereof and the inner periphery of the casing 5.

Figure 7:
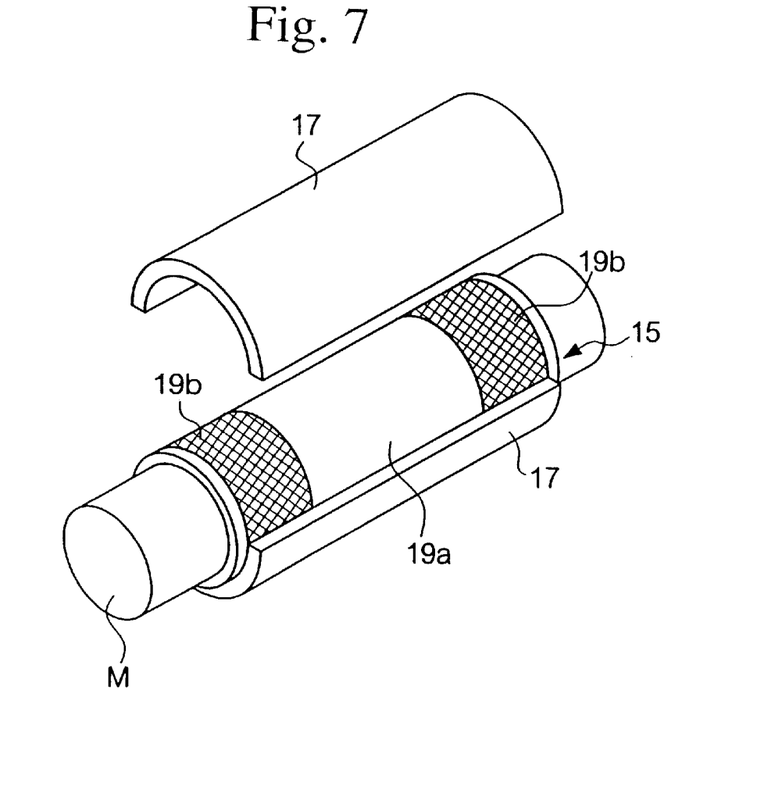
FIG. 7 is a perspective view showing a condition where the stator winding is being fitted inside a stator core of divided construction.

Furthermore, the stator core 17, as shown in FIG. 7 is, for example, made up of two divided cores-17 evenly divided circumferentially. However this may be made up of a plurality of ring shaped electrical steel plates which are laminated in the thickness direction.

The stator winding 15, is in the form of a hollow cylinder with an outer diameter larger than the inner diameter of the stator core 17, and is secured by means of an insulation layer 19 so that the inner peripheral face of the stator core 17 faces the outer peripheral face of the stator winding 15.

That is to say, the stator winding 15 is assembled inside the stator core 17 in a radially inward compressed condition, and is thus mechanically secured to the inner periphery of the stator core 17 with a resilient force pressing so as to expand the winding in the normal direction (radial outward direction).

The insulation layer 19 is a laminated structure comprising a heat dissipating sheet arranged so as to cover the whole circumference and the whole length of the stator winding 15, and a protective sheet arranged over the heat dissipating sheet only at the opposite ends of the stator winding 15 so as to cover the whole circumference of the heat dissipating sheet.

The heat dissipating sheet 19a comprises a rubber type material reinforced with a glass cloth or a polyester mesh cloth or the like, and having a flexible property so as to be deformable by pressing, and contains a filler with heat conducting properties.

That is to say, since the heat dissipating sheet is reinforced with a glass cloth or a polyester mesh cloth, the tear strength is excellent. Hence in the case where with this inserted between the inner peripheral face of the stator core 17 and the outer peripheral face of the stator winding 15, the stator winding 15 is subjected to a force so as to press and expand the stator winding 15 in the normal direction (radial outward direction), the undesirable situation where tearing or the like occurs so that the insulation properties are impaired, does not arise.

Moreover, since the heat dissipating sheet is made from a rubber type material having flexibility so as to be deformable by pressing, it is possible to have a very close contact between the inner peripheral face of the stator core 17 and to the outer peripheral face of the stator winding 15.

Therefore, close contact can be maintained, and due to the improvement in thermal conductivity of the rubber type material by incorporating a filler with good thermal conductivity, heat dissipation can be improved while maintaining insulation properties.

For a heat dissipating sheet having such physical properties, a silicone rubber sheet with boron nitride powder having good heat conducting properties dispersed in silicone rubber is suitable.

The reason for this is that since the silicone rubber sheet has elasticity, one surface is closely contacted to replicate the irregularities of the stator winding 15, while the other surface is closely contacted with the stator core 17. The protective sheet 19b must have excellent mechanical characteristics, insulation properties, heat tolerance, and varnish resistance, and for example a Nomex sheet type 410 made by Dupont is suitable.

Next is a description using FIG. 2 through FIG. 12, of an embodiment of a manufacturing method for the slotless stator 1 according to the present invention.

With the following embodiment, the description is given for the case where a silicone rubber sheet 19a with the thermal conductivity set at 3.8 W/m·k is used for the heat dissipating sheet, and a Nomex sheet 19b is used for the protective sheet.

At first, a hollow cylindrical shape stator winding 15 is formed by combining together a plurality of approximately rhombic shape coil segments 23a, 23b, and 23c.

Figure 2:
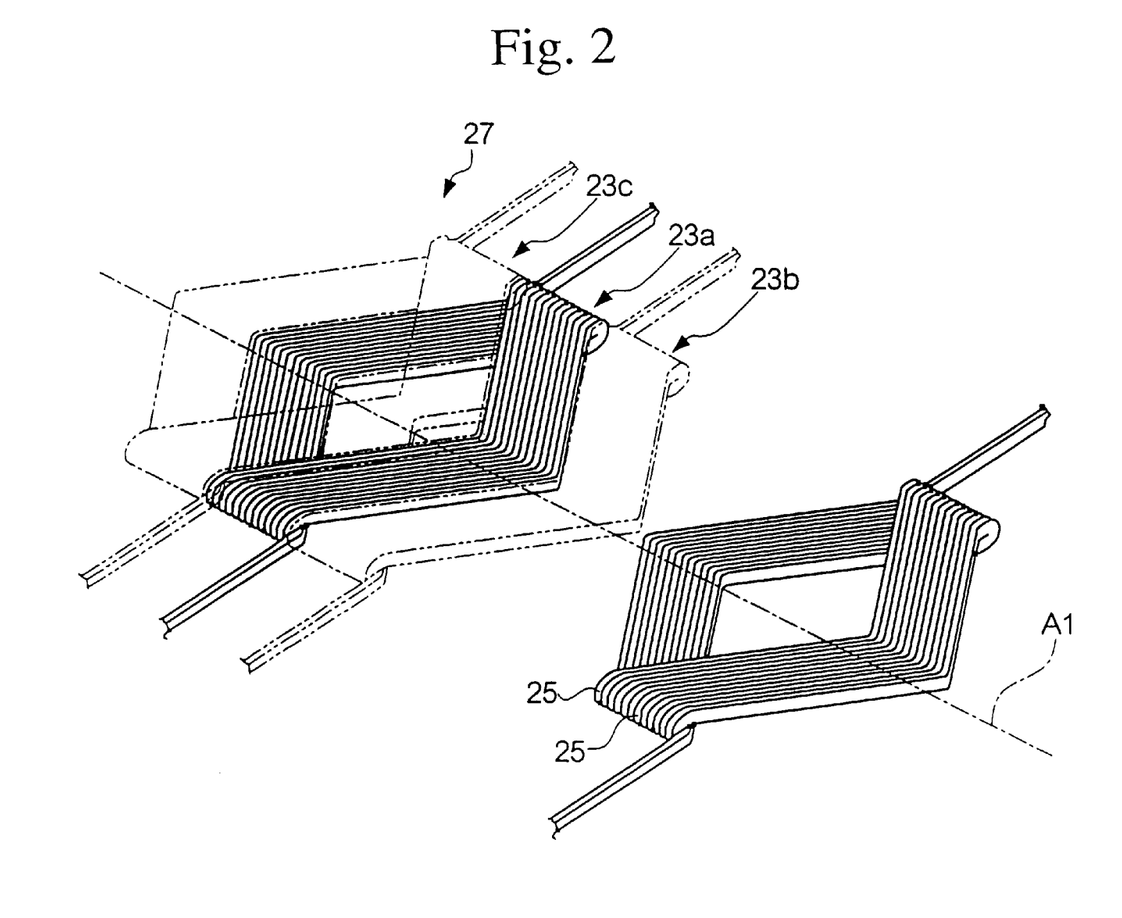
FIG. 2 is a perspective view showing a condition where a band shape body is formed from a plurality of coil segments.

The coil segments 23a, 23b and 23c are formed by forming turns by winding a wire sheaf 25 of a plurality of fine wires composed of conductors bundled together, through one turn in an approximate rhombic shape, and then winding and arranging a plurality of the turns so that the turns are sequentially shifted continuously so as to be adjacent to each other in the direction of one diagonal A1 of the rhombic shape (refer to FIG. 2).

Figure 3:
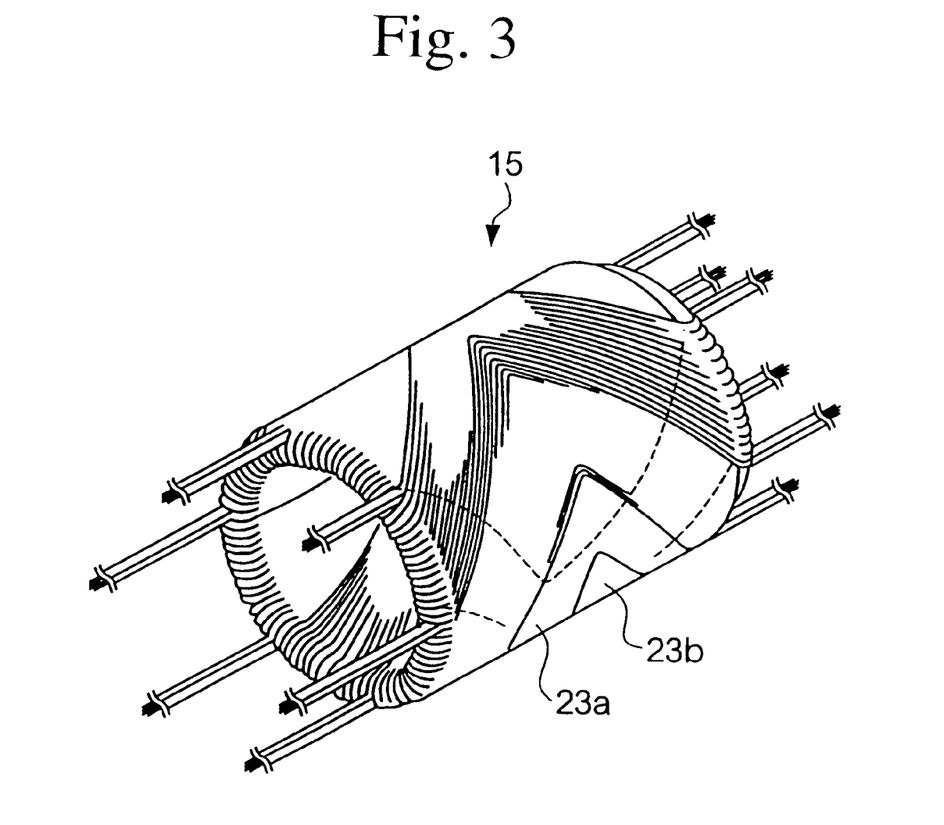
FIG. 3 is a perspective view showing a stator winding formed by wrapping the band shape body comprising the plurality of coil segments, into a cylindrical shape.

Then after sequentially shifting and overlapping the coil segments 23a, 23b and 23c in the direction of the diagonal line A1 to form a band shape body 27, the band shape body 27 is rolled into a hollow cylindrical shape to thereby give the hollow cylindrically shaped stator winding 15 (refer to FIG. 3).

Figure 4:
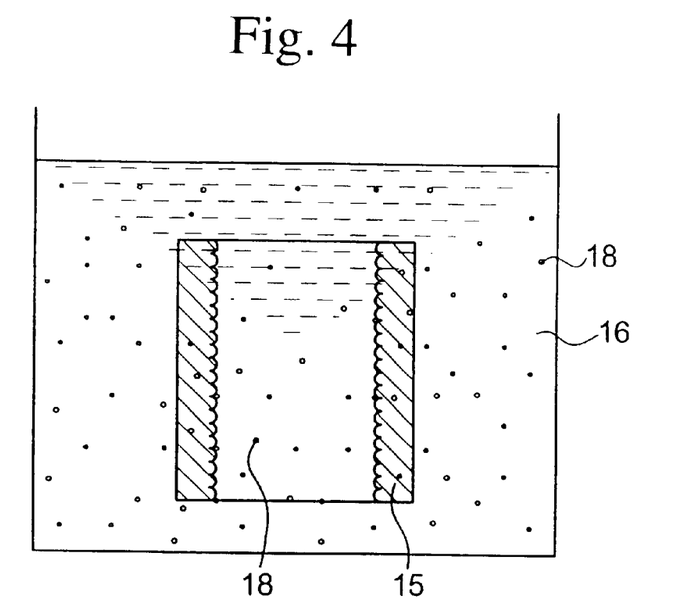
FIG. 4 is a diagram showing a condition where the stator winding is immersed in an alcohol solvent in which BN particles have been mixed.

After this, the stator winding 15 is immersed in an alcohol solvent 16 into which BN particles 18 have been mixed so that the BN particles 18 are filled from the surface of the stator winding 15 to the interior thereof (refer to FIG. 4).

After this, the stator winding 15 is withdrawn from the alcohol solvent 16 and air dried to evaporate the volatile alcohol.

Figure 5:
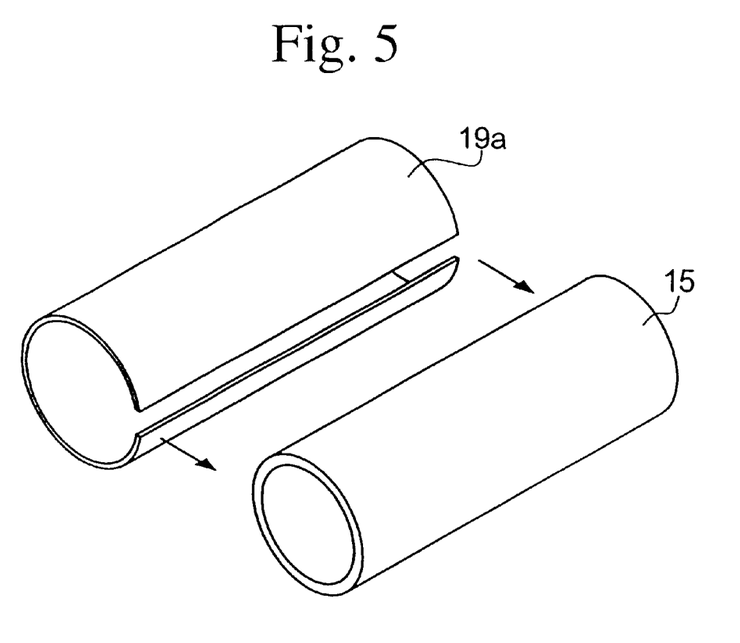
FIG. 5 is a perspective view showing a condition where a silicone rubber sheet is to be wrapped around a stator winding.

Next, the silicone rubber sheet 19a is wrapped around the outer periphery of the stator winding 15 over the whole circumference and the whole length (refer to FIG. 5).

Figure 6:
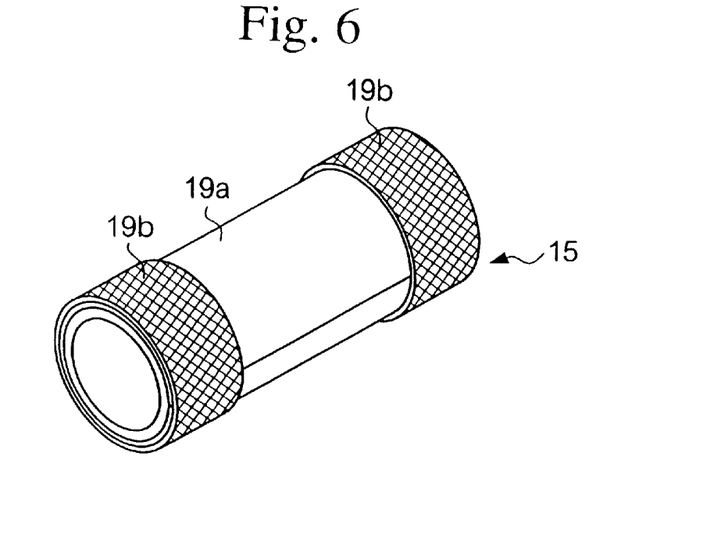
FIG. 6 is a perspective view showing a condition where Nomex sheeting is further wrapped around outer peripheral end portions of the stator winding which is wrapped with the silicone rubber sheet.

Then, the Nomex sheet 19b is repeatedly wrapped around the opposite outer peripheral end portions of the stator winding 15 which have been wrapped with the silicone rubber sheet 19a (refer to FIG. 6).

After this, the stator winding 15 which is wrapped with the silicone rubber sheet 19a and the Nomex sheet 19b is assembled inside the stator core 17 (refer to FIG. 7).

This assembly operation is carried out by first oppositely arranging the two portions of the core 17, of divided cores-17 so that the inner peripheral faces thereof face each other with a constant gap in the vertical direction, then mounting the stator winding 15 on the inner peripheral face of the divided core 17 arranged on the lower side, using a rod shape jig M, and bringing together this divided core-17, and the divided core-17 arranged on the upper side to thereby assemble the divide cores 17 into a cylindrical shape.

By so doing, the stator winding 15 is assembled inside the stator core 17 in a radially inward compressed condition.

At this time, since the stator winding 15 functions as a spring pressing the inside of the stator core 17 so as to expand in the normal direction (the radial outward direction), the stator winding 15 is mechanically secured by the resilient spring force at that time to the inner periphery of the stator core 17.

Moreover, since the silicone rubber sheet 19a has inherent elasticity, then the beforementioned resilient force is further strengthened, so that the stator winding 15 is more stably secured inside the stator core 17.

Furthermore, with the silicone rubber sheet 19a, due to the elastic deformation thereof, one surface is closely contacted so as to replicate the outer peripheral irregularities of the stator winding 15, and the other surface is closely contacted to the inner periphery of the stator core 17. Therefore heat dissipation at the time of operation is markedly improved.

Figure 8:
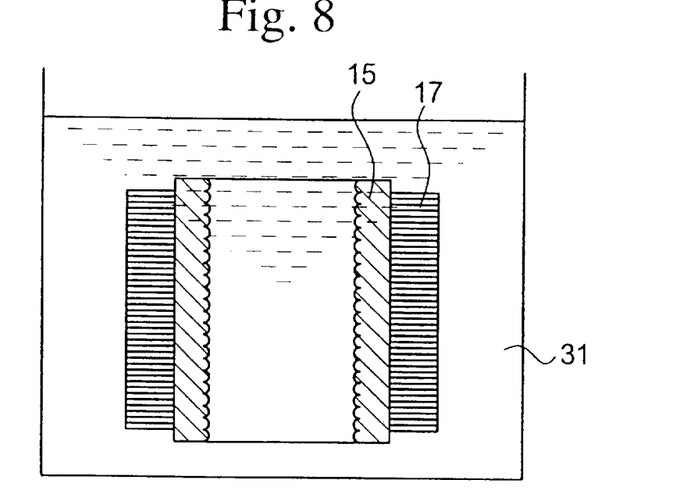
FIG. 8 is a diagram showing a condition where the stator core and stator winding are immersed in a varnish tank while being held together.
Figure 9:
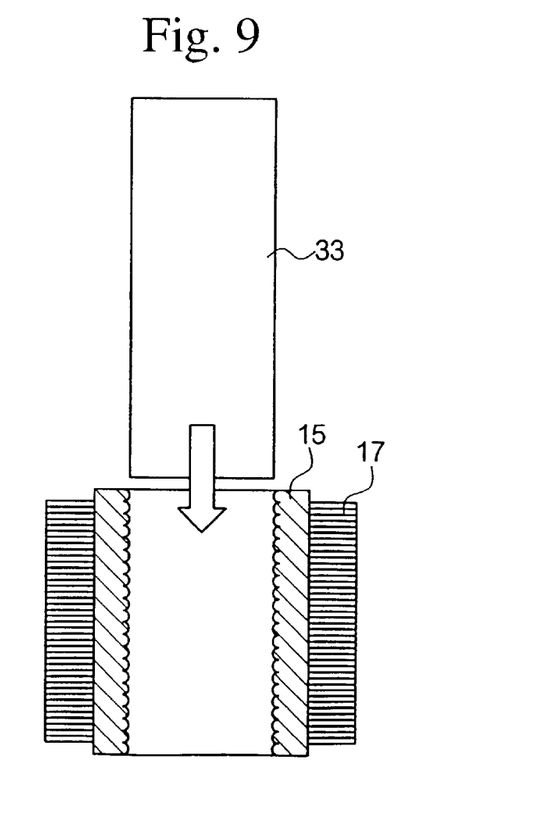
FIG. 9 is a diagram showing a condition where a mandrill is inserted into the inner periphery of the stator winding which has been inserted into the stator core.

After this, the stator core 17 and the stator winding 15 are held together as one and immersed in a varnish impregnation tank 31 (refer to FIG. 8). Subsequently, these are all put into a vacuum chamber (not shown in the figure) and subjected to vacuum impregnation.

At this time, since the outer peripheral face of the stator winding 15 and the inner peripheral face of the stator core 17 are in close contact with the silicone rubber sheet 19a, there is practically no impregnation there between with the varnish.

Then, after impregnating varnish into the stator winding 15, the stator core 17 and the stator winding 15 are withdrawn from the varnish impregnating tank 31 in the held together condition.

Figure 10:
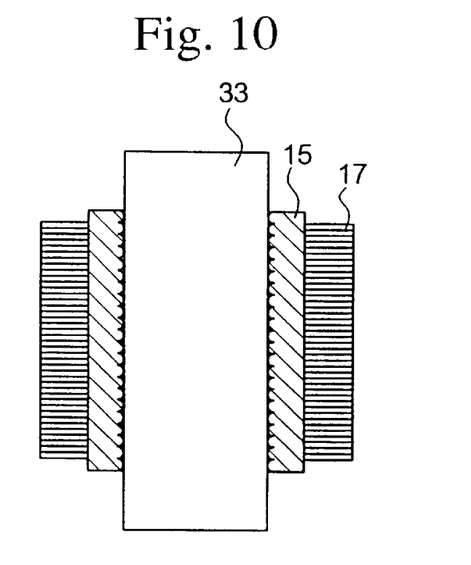
FIG. 10 is a diagram showing a condition where varnish is heat hardened with the stator core, the stator winding, and the mandrill held together as one.

After this, a fluoroplastic mandrel 33 is inserted into the inner periphery of the stator winding 15 (refer to FIG. 9), and the stator core 17, the stator winding 15 and the mandrel 33 are all heated while being held together as one, to thereby heat harden or cure the varnish (refer to FIG. 10).

At the time of this heat hardening, the mandrel 33 thermally expands so that its diameter increases. Hence the outer periphery of the mandrel 33 contacts with the inner periphery of the stator winding 15 and further presses the stator winding 15 against the inner peripheral side of the stator core 17.

Figure 11:
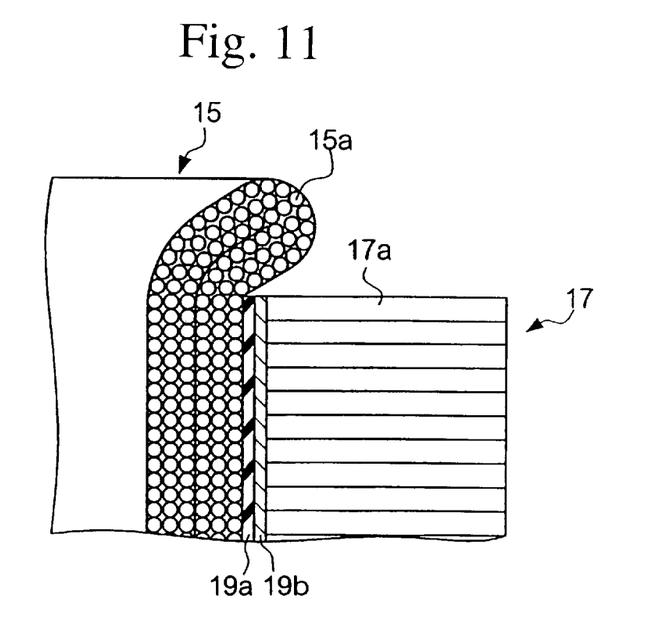
FIG. 11 is an enlarged view of the main parts of FIG. 10.

Since at this time, the silicone rubber sheet 19a and the Nomex sheet 19b are inserted as two layers between the end portions of the stator winding 15 and the end portions of the stator core 17, the end portions of the stator winding 15 are reinforced and effectively protected from damage due to external loading (refer to FIG. 11).

Consequently, at the time of radial expansion of the mandrel 33, even if a stress concentration occurs with pressing on the edge portion of the stator core 17 by the edge portion of the stator winding 15, shorts of the stator winding 15 due to the stator winding 15 being damaged and the insulating characteristic of the insulation layer 19 being lost are avoided.

Figure 12:
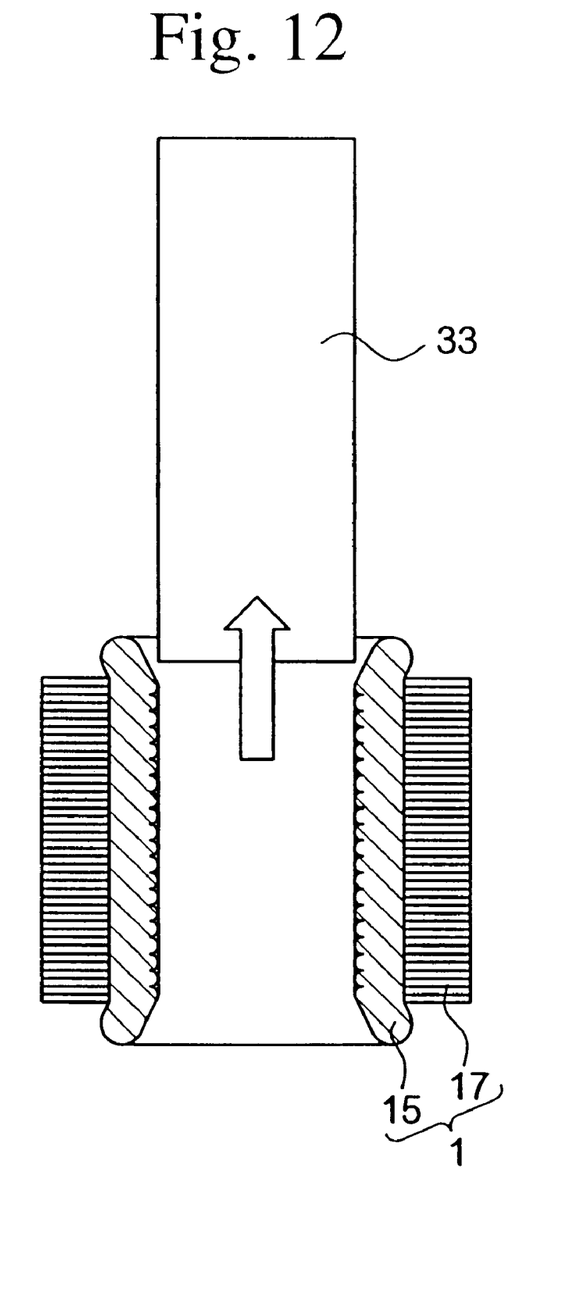
FIG. 12 is a diagram showing a condition where after varnish hardening, the mandrill is withdrawn.

Then, after the varnish hardens the mandrel 33 is withdrawn, and the slotless stator 1 is completed (refer to FIG. 12).

Here with the present embodiment, the heat dissipating sheet and the protective sheet are separate bodies, however these may be one body. In this case, the end portion of the heat dissipating sheet could, for exapmle, be turned back, and this turned back portion forms the protective sheet.

To explain more specifically, a silicone rubber sheet 19a which is wider than the full length of the stator winding 15 is wrapped around the stator winding 15, and the surplus portions of the silicone rubber sheet 19a which protrude from the opposite ends of the stator winding 15 are bent back so that the inner surface becomes the outer surface. As a result, the silicone rubber sheet 19a is configured so as to be folded over as two layers at the opposite end portions of the stator winding 15.

With the above embodiment, the cylindrically shaped stator winding 15 is formed by combining together the approximately rhombic shaped plurality of coil segments 23a, 23b, and 23c. However this may of course be formed by some other method.

As will be clear from the above description, with the present invention, the following effects are obtained.

(a) With the first aspect of the invention, by inserting the heat dissipating sheet between the stator core having no slots and the stator winding, variations in temperature distribution along the circumferential direction of the stator at the time of operation can be suppressed. Hence the close contact condition between the stator core and the stator winding are more reliably maintained. Moreover, the heat generated in the stator winding can be effectively transmitted via the heat dissipating sheet. Hence heat dissipation is further improved.

(b) With the second aspect of the invention, since the heat dissipating sheet contains a filler such as boron nitride particles having good thermal conductivity, heat dissipation can be improved without causing a drop in strength or insulation properties.

(c) With the third aspect of the invention, by using for the heat dissipating sheet a sheet made from a rubber type material having flexible properties, being deformable by pressing, one surface thereof can be closely contacted with the stator winding surface so as to replicate the irregularities thereof, while the other surface can be closely contacted with the stator core. Therefore the heat dissipation can be further improved while maintaining insulation properties.

(d) With the fourth aspect of the invention, by using for the heat dissipating sheet a rubber sheet reinforced with a reinforcing material such as glass cloth or a polyester mesh cloth, then even if at the time of assembling the stator core and the stator winding, a force occurs so as to press and expand the stator winding in the normal direction, the undesirable situation where tearing or the like occurs so that the insulation properties are impaired, does not arise.

(e) With the fifth aspect of the invention, by further inserting a protective sheet between the end portions of the stator core and the end portions of the stator winding, the end portions of the stator winding are reinforced by the protective sheet. Therefore, even if a stress concentration occurs at the end portion, the stator winding can be effectively prevented from being damaged, so that good insulation properties can be maintained.

Although there have been described what are at present considered to be the preferred embodiments of the invention, it will be understood by persons skilled in the art that variations and modifications may be made thereto without departing from the gist, spirit or essence of the invention. The scope of the invention is indicated by the appended claims.

What is claimed is:

1. A stator of a rotating electrical machine, the rotating electrical machine comprising a casing that forms an outer shape, a rotor which is rotatably arranged through bearings along a central axis of said casing, and a stator formed between said casing and said rotor;

wherein said stator of said rotating electrical machine comprises:
a cylindrical stator core having no slots, arranged around said rotor;
a cylindrical stator winding accommodated between the inside of said cylindrical stator core and said rotor forming a gap with an outside of said rotor; and
a heat dissipating sheet inserted between said stator core and said stator winding.

2. A stator of a rotating electrical machine according to claim 1, wherein said heat dissipating sheet contains a filler having good thermal conductivity.

3. A stator of a rotating electrical machine according to claim 2, wherein said heat dissipating sheet is made from a rubber type material having flexible properties, and which is deformable by pressing.

4. A stator of a rotating electrical machine according to claim 2, wherein said heat dissipating sheet is a rubber sheet reinforced with a reinforcing cloth material.

5. A stator of a rotating electrical machine according to claim 4, wherein said reinforcing cloth material comprises at least one of glass cloth and polyester mesh cloth.

6. A stator of a rotating electrical machine according to claim 2, further comprising a protective sheet inserted between an end portion of said stator core and an end portion of said stator winding.

7. A stator of a rotating electrical machine according to claim 6, wherein a pair of said protective sheets are respectively inserted between opposite end portions of said stator core and corresponding end portions of said stator winding.

8. A stator of a rotating electrical machine according to claim 6, wherein said heat dissipating sheet and said protective sheet are made from the same material.

9. A stator of a rotating electrical machine according to claim 1, wherein said heat dissipating sheet is made from a rubber type material having flexible properties, and which is deformable by pressing.

10. A stator of a rotating electrical machine according to claim 9, wherein said heat dissipating sheet is a rubber sheet reinforced with a reinforcing cloth material.

11. A stator of a rotating electrical machine according to claim 10, wherein said reinforcing cloth material comprises at least one of glass cloth and polyester mesh cloth.

12. A stator of a rotating electrical machine according to claim 9, further comprising a protective sheet inserted between an end portion of sad stator core and an end portion of said stator winding.

13. A stator of a rotating electrical machine according to claim 12, wherein a pair of said protective sheets are respectively inserted between opposite end portions of said stator core and corresponding end portions of said stator winding.

14. A stator of a rotating electrical machine according to claim 1, wherein said heat dissipating sheet is a rubber sheet reinforced with a reinforcing cloth material.

15. A stator of a rotating electrical machine according to claim 14, further comprising a protective sheet inserted between an end portion of said stator core and end portion of said stator winding.

16. A stator of a rotating electrical machine according to claim 15 wherein a pair of said protective sheets are respectively inserted between opposite end portions of said stator core and corresponding end portions of said stator winding.

17. A stator of a rotating electrical machine according to claim 14, wherein said reinforcing cloth material comprises at least one of glass cloth and polyester mesh cloth.

18. A stator of a rotating electrical machine according to claim 1, further comprising a protective sheet inserted between an end portion of said stator core and an end portion of said stator winding.

19. A stator of a rotating electrical machine according to claim 18, wherein a pair of said protective sheets are respectively inserted between opposite end portions of said stator core and corresponding end potions of said stator winding.

20. A stator of a rotating electrical machine according to claim 18, wherein said heat dissipating sheet and said protective sheet are made from the same material.

21. A stator of the rotating electrical machine according to claim 18, wherein said protective sheet contains a filler having high thermal conductivity, and said heat dissipating sheet also contains a filler having high thermal conductivity.

22. A stator of the rotating electrical machine according to claim 18, wherein said protective sheet contains particles having high thermal conductivity, and said heat dissipating sheet also contains particles having high thermal conductivity.

* * * * *

UNITED STATES PATENT AND TRADEMARK OFFICE
CERTIFICATE OF CORRECTION

PATENT NO. : 6,525,437 B1
DATED : February 25, 2003
INVENTOR(S) : Masaru Ozawa and Takeo Fukuda It is certified that error appears in the above-identified patent and that said Letters Patent is hereby corrected as shown below:

Column 3,
Lines 34, 39 and 42, change "mandrill" to -- mandrel --.

Column 5,
Line 8, delete "to".

Column 6,
Line 2, change "of divided" to -- or the divided --.
Line 9, change "divide" to -- divided --.
Line 38, change "there between" to -- therebetween --.

Column 7,
Line 7, change "exapmle" to -- example --.

Column 8,
Line 56, change "sad" to -- said --.

Column 9,
Line 1, after "and" insert -- an --.

Column 10,
Line 2, change "potions" to -- portions --.

Signed and Sealed this

Twelfth Day of August, 2003

JAMES E. ROGAN
*Director of the United States Patent and Trademark Office*